June 4, 1940.                  A. MALICOV                    2,203,574
                    MANOMETER FOR USE WITH VACUUM APPARATUS
                        Filed June 9, 1937           2 Sheets-Sheet 1

A. Malicov
Inventor

By: Glascock Downing Seebold
Attys.

June 4, 1940.　　　　　A. MALICOV　　　　2,203,574
MANOMETER FOR USE WITH VACUUM APPARATUS
Filed June 9, 1937　　　2 Sheets-Sheet 2
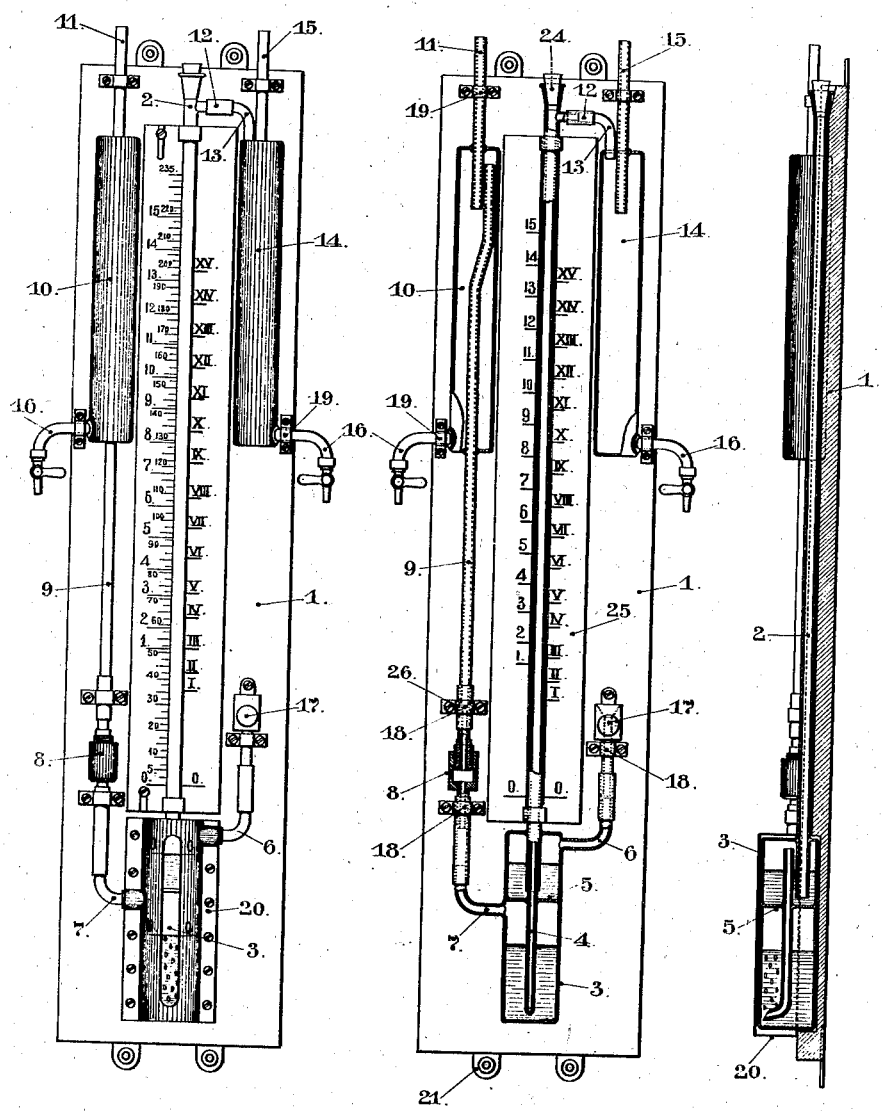
A. Malicov
INVENTOR
By: Glascock Downing & Seebold
Attys.

Patented June 4, 1940

2,203,574

UNITED STATES PATENT OFFICE 2,203,574

MANOMETER FOR USE WITH VACUUM APPARATUS

Andrej Malicov, Moscow, Union of Soviet Socialist Republics

Application June 9, 1937, Serial No. 147,322. In Union of Soviet Socialist Republics September 10, 1934

1 Claim. (Cl. 73—31)

In various industries the boiling point of liquid products is carried out in vacuum apparatus or boiling vessels operating intermittently. Thus, for instance, different extracts, starch syrup, caramel material, soap, milk and the like are boiled down in this way, the object only being to obtain a greater degree of concentration until a prescribed content of the dry material is reached in the final product. A more complicated process for condensing solutions by boiling down for the purpose of producing crystalline products is made use of in the sugar and chemical industries. For this purpose crystallisation vacuum boiling apparatus operating intermittently are used, the reason being that the product obtained from boiling down, the massecuite gives the greatest yield of crystalline substances only at a definite size and uniformity of the crystals, which however can only be obtained with a single introduction of the seed crystals by growth in intermittently operating apparatus.

In the sugar industry of the whole world only such intermittently operating apparatus are actually used, attempts to use continuously operating apparatus not having proved successful.

The boiling down or evaporating process for the simple concentration of solutions and for the boiling down to crystallisation consists substantially in this, that the solution to be concentrated is pumped into the boiling apparatus in successive batches and, after each pumping operation, is boiled down to a certain density, such operation being repeated until a certain limited quantity of the final product which has been boiled down to a certain density has been produced.

The gradual nature of the increase of the quantity and of the degree of density of the material to be boiled down instead of abrupt steps is also of great importance for the smooth concentration of the solutions, as in this way the time taken for boiling down is reduced to a minimum. In boiling down crystalline mixtures or the massecuite such a gradual increase in the quantity and the degree of density is not only favourable as regards the greater efficiency of the apparatus, but is even indispensable for the proper carrying out of the crystallisation process. The correct determination of the moments for pumping in the batches, that is to say of the degree of density of the material to be boiled down in each stage of the boiling operation, and of the quantity to be pumped in each batch is in this case of particular importance.

Nevertheless, in spite of the well known employment of the boiling down process, in many branches of the industry, there are no reliable methods and apparatus for controlling or regulating it.

Thus for instance, in the sugar industry for checking the boiling operation of the massecuite various ebulliscopic, optical and electrometrical apparatus have been proposed. These apparatus, however, can only check the concentration of the mother lye, but not the process of the formation of the crystal mixture or the quantitative relation of the material to be boiled down and the products to be pumped in the batches. Moreover the checking of the degree of concentration of the mother lye with these apparatus is very difficult, since the variable chemical composition of the solutions and the temperature fluctuations of the same very greatly affect the readings of the apparatus. For this reason the regulation of the boiling down operation of the various solutions or of the massecuite has been carried out by experienced persons according to empirical characteristic signs, by eye.

Now it has been ascertained through practical and theoretical investigations by the applicant, that the degree of concentration of the solutions or suspensions can be determined through the boiling down process with sufficient degree of accuracy, independently of the chemical composition of the material to be boiled down and the temperature conditions of the boiling process, by measuring the relative weight of the quantity of water evaporated out of the given mass.

It has been found that, if the degree of concentration of the material to be boiled down is determined with an accuracy up to about 1 to 2% of the dry materials in the same, that is to 1° to 2° Brix, it is possible in this way to control not only the boiling down of the solutions, but also the correct course of the crystallisation of the substances separating out from them.

Thus, for instance in the sugar industry, when boiling the massecuite, it has been found to be entirely sufficient for controlling the crystallisation process to determine the density of the material to be boiled down with an accuracy to 2° Brix, without taking into account the temperature and vacuum variations which influence the degree of super saturation of the solution, for the reason that the magnitude of the vacuum variations does not exceed 10 cm. of the column of mercury and the corresponding fluctuations on the boiling temperature of the concentrated solutions also remain within the range of 10° (from 75° to 85° C.).

With constant concentration, for instance 80° Brix, the temperature fluctuation of 10° cannot produce a change in the super saturation coefficient of more than 0.17. As the admissible variation of the same during the crystallisation lies between 1.0 and 1.4, an error of 0.17 is negligible. Moreover, the temperature fluctuation of 10° applies to the entire boiling process from the syrup to the boiled down massecuite.

Actually however, the temperature for equal time intervals of the boiling process fluctuates within considerably narrower limits, namely not more than by 2° to 3° C.

Thus, for instance, if the boiling temperature of the particular syrup introduced should be 65 to 70°, that a temperature when introducing the crystals will always remain within the same limits 77 to 80°.

Hence, the measuring of the relative weight of the evaporated water or the determination in Brix of the concentration of the material to be boiled down provides a sufficiently accurate checking method for controlling the boiling process of the massecuite for the manufacture of sugar and the like.

The present method consists in this, that for checking the quantities of the solutions to be collected in the boiling apparatus and the quantity of the water (the solvent) to be evaporated out of them the continuous determination of the weight of the hydrostatic column of the boiling liquid is carried out in the boiling apparatus itself by means of a manometer arrangement of a certain construction.

In the accompanying drawings,

Figures 2, 3 and 4 show the checking apparatus itself, and Figure 5 the combined plant for the centralised control of the boiling process by means of such apparatus.

Figure 1:
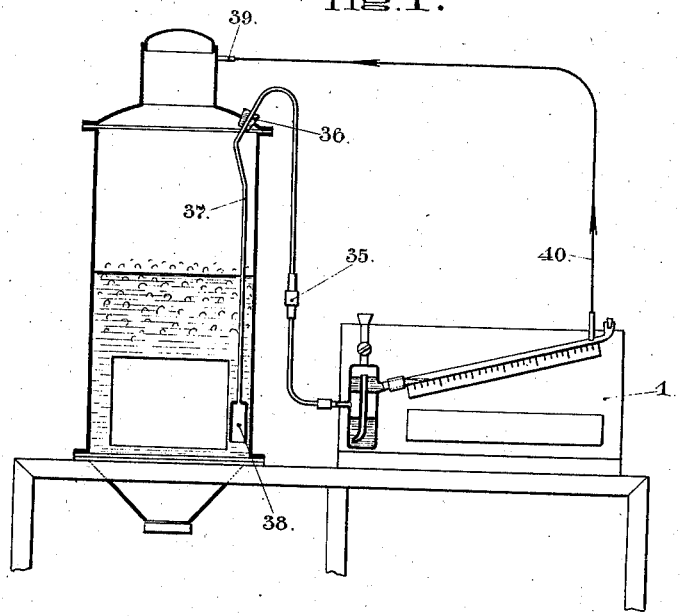
Figure 1 shows diagrammatically the general arrangement of the checking apparatus on a boiling apparatus according to the present invention.

In Figure 1 the hydrostatic column of the boiling material is determined in the vacuum apparatus itself by means of the appliance 1 which is connected to it by means of the tubes 37, 40.

The fine tube 37 opens below the level of the boiling material and terminates in an air bell 38 of large diameter which opens into the interior of the boiling apparatus. The other end of the fine tube 37 is connected to the vessel of a liquid pressure gauge 1 which may be placed at a distance from the boiling apparatus.

The fine tube 40 connects the space in the boiling apparatus above the liquid level with the upper end of the measuring tube and the manometer. When the boiling apparatus is being filled with the liquid the latter shuts off in the air bell 38 a definite volume of air, compresses it and transmits the pressure in the manometer cup to the column of measuring fluid, for instance, to the mercury. The manometer cup is constructed as a totally enclosed vessel. According to the amount of material to be boiled, which is introduced into the boiling apparatus and consequently the compression of the air in the bell 38, the liquid level will rise, even if only to a small extent, and the transmission of the pressure to the column of measuring fluid will give in the manometer a measure with variable initial level of the material in the apparatus. A much more complete method of transmitting the pressure to the manometer with a constant zero level of the boiling materials to be measured consists in this, that a small stream of air is conveyed continuously through the manometer cup to the tube 37 into the bell 38, which stream of air fills the bell and escapes over its lower rim. In this way the air pressure in the bell 38 and consequently in the manometer cup will always be equal to the pressure of the boiling liquid or its vapours in the sectional plane of the boiling apparatus, passing through the lower rim of the air bell.

When the boiling apparatus is at atmospheric pressure or at a pressure above atmospheric pressure the air must be introduced into the tube 37 under the pressure of about 0.5 atmosphere. When, however, the boiling apparatus is working with a vacuum, no pressure is required for this purpose, the determination of the hydrostatic column of the boiling material being obtained at the expense of the vacuum pertaining in the apparatus.

In vacuum apparatus of the larger kind a quantity of about 4 cm. of massecuite of a specific gravity of 1.45 will usually be boiled down. This corresponds to the weight of a mercury column of $$H = \frac{4.0 \times 1.45}{13.6} = 0.426 \text{ m.} = 42.6 \text{ cm.}$$

Consequently a vacuum of 45 cm. mercury column will already suffice for enabling the air to penetrate to the cup of the manometer and be drawn by suction to the tube 37 into the vacuum apparatus. In order, when the vacuum apparatus is being emptied, to prevent the material to be boiled from entering the tube 37, a non return valve 35 is provided which prevents the air compressed in the air bell from returning through the manometer cup. The same object may be obtained without the non return valve 35 through cutting out the manometer by closing a cock in the tube 37.

Figure 1 shows a liquid manometer 1 with an inclined measuring tube for boiling apparatus of smaller capacity.

For controlling the boiling operation according to the present checking method of determining the weight of the hydrostatic column of the boiling liquid various kinds of existing manometer appliances can be used, for instance a bell tension meter, a mercury ring balance, the mechanism of a metal manometer and the like.

A suitable constructional form of such a liquid manometer for controlling the boiling operation in the apparatus of larger capacity is shown in Figures 2, 3 and 4.

On a board 1 is fixed a glass tube 2 which is fused into the cup 3. The tube 2 opens into the cup 3 below the mercury level and does not extend to the partition 5. In its upper part a branch 12 is provided for connecting up to the receptacle 14 for the condensate and thence to the vacuum space of the vacuum apparatus. The cup 3 is divided by the partition 5 into two spaces, the upper manometric cup with the air inlet branch 6 and the lower checking cup with a branch 7 for conveying the air flowing through the checking liquid into the air bell below the liquid level in the vacuum apparatus.

Behind the branch 7 is provided a non return valve 8 which consists of a rubber disc which with one of its edges is clamped in a metal cylinder or a metal ball. The air then passes through a tube 9 into the cylindrical receptacle 10 for the condensate and from there through the tube 11 into the air bell referred to above.

The re-adjustment of the amount of air flow, which has to be effected only once when the apparatus is being adjusted, is effected by the needle valve 17. The cup of the apparatus is protected from damage by a casing 20 which is provided with a slot for observing the movement of the air in the checking cup. On this casing is marked the level of the mercury to be poured in and of the checking liquid.

Mercury is poured into the apparatus through the funnel of the tube 2, which is closed by a rubber plug 24 and the checking liquid is poured in through the regulating valve 8. On either side of the tube 2 are fixed the scales.

The control of the boiling process by means of such a manometer apparatus is very simple with scales graduated in this manner.

Each time the filling valve is opened, only the left-hand scale is watched and then, up to the next pumping operation, the change in the mercury column is observed only on the right-hand scale. When for instance the filling of the syrup into the apparatus has started, the left-hand scale is watched until the mercury rises to the limit "introduction of the syrup" and at this moment the filling valve is closed. Thereupon the right-hand scale is watched until, according to the boiling down of the solution, the mercury drops to the mark I—"introduction of the crystals." At this moment powdered sugar is introduced into the apparatus and the pumping in of the first batch is commenced, which is continued until the scale marked 1 on the left-hand scale is reached. When the mercury column has fallen to the mark II on the right-hand scale, the second pumping operation is started and is continued, until the mercury reaches the scale mark 2 on the left-hand scale. This is continued until the mercury column reaches the mark on the left-hand scale, indicating the end of the boiling.

Such an apparatus with two scales always gives a clear view of which pumping operation has already been performed and which pumping operation is to commence.

If, for instance, on the left-hand scale the mercury column is between the 8th and 7th pumping operation, but higher than IX, the supervisor will know, that the 8th pumping operation has already been performed and the commencement of the 9th pumping operation is imminent.

If, however, he should have overlooked the commencement of the 9th pumping operation and should the mercury column stand between 8 and 7, but below IX, this is a sign that the 8th pumping operation has already taken place and that the 9th must be carried out quickly.

The apparatus thus gives a full and clear indication of the operation stage of the boiling apparatus and makes it possible to prepare quietly and in due time for the next following operations.

At the beginning of the graduations of the apparatus the usual millimeter paper is fixed to one of the scales and by these divisions the positions of the mercury column through a trial boiling operation are marked, with the various boiling times. In this way a number of boiling operations is carried out and of these the most favourable is chosen. The markings thus obtained are thereupon plotted on the actual scales of suitable material, such as milk glass or cardboard, the latter being thereupon coated with a transparent varnish and fixed to a metal plate.

In this way the new method of control, involving hydrostatic heat measurement, makes it possible to mark on the scale of the manometer apparatus the beginning and the end of the pumping of each batch and also the other operations of the boiling process: introduction of steam, initiation of the crystallisation, charge over of different solutions and the like.

All these operations are marked on the scale during the preliminary control boiling operation and are thereupon repeated each time according to the markings on the apparatus. The basic condition for obtaining constant results of the boiling process with such a mechanical repetition of the individual operations would appear to be the constant state of concentration of each solution which is to be pumped in.

The experiments for the boiling down of the refined sugar massecuite, which have been carried out, have shown that the variations in the degree of concentration of the initial syrup, which amount to 5 to 7° Brix, have no influence on the final result of the boiling process.

In each case the massecuite boiled down by the present process from such syrup, showed a constant concentration of 92.71° Brix.

For this reason the manometer apparatus according to the present invention for the boiling down of all products of refined sugar manufacture and of the secondary products of raw ground sugar manufacture, in which the concentrations of the initial products have a maximum variation of 5° Brix, may be provided with a constant scale, by which the best results are obtained. For boiling down the first product in the manufacture of fine ground sugar either the syrup concentration must be regulated during boiling down in such a manner that its variations remain within the limits of 5° Brix or the graduations on the measuring scale of the manometer must be altered to suit the sharp variations in the syrup concentration.

When for instance the massecuite is being boiled down from a syrup of 60 to 65° Brix, the operation is carried out according to one scale, when however the syrup has a concentration of 50 to 55° Brix, another scale is used, which corresponds to this concentration.

Much more convenient is the boiling down of the massecuite from the so-called standard syrup, such as has latterly been produced in sugar factories.

The present method of controlling the boiling down process, by continued checking of the relative weight of the evaporated water by means of a manometer apparatus is suitable in all cases of boiling down any solution or suspension in the vacuum apparatus and the boiling vessels used in the food-stuffs and chemical industry, products being boiled down in most cases, which have only slightly varying content of water or other solvent, which is determined for each kind of manufacture.

The boiling process is carried out similarly to that described for the manufacture of sugar.

Figure 5:
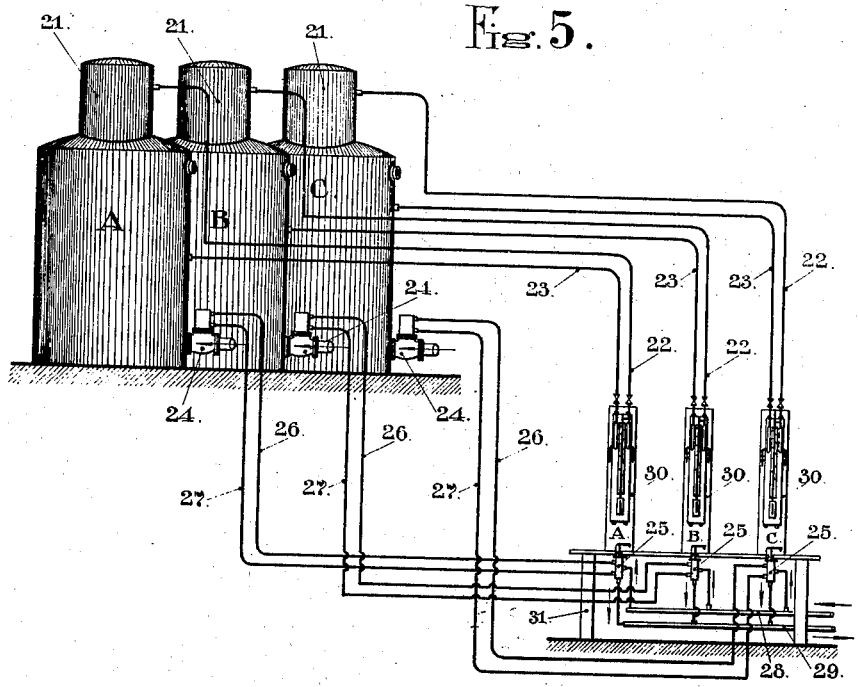

Figure 5 of the accompanying drawings shows an installation with central control of the boiling process in a number of boiling apparatus fitted with the manometer appliance according to the invention.

The vacuum apparatus A, B, C are connected through the tubes 22, 23 with the associated manometers 30A, 30B, 30C, which are mounted on a common control board 31. Each boiling apparatus is provided with an automatically acting valve 24 which is operated by the turning of the associated slide valve 25 from the control board 31 by means of hydraulic or steam transmission of the pressure to the tubes 26—27 which are fed from the pipe 28. The waste water or steam flows from the valves 24 through the slide valves 25 into the return pipe 29.

Having now particularly described and ascertained the nature of my said invention and in what manner the same is to be performed, I declare that what I claim is:

A manometer for measuring the difference of pressure below the level of boiling material and above the same in a vacuum apparatus by means of pneumatic pressure transmission comprising a cup, said cup being divided by a partition into an upper chamber and a lower chamber, a liquid partially filling both chambers, a tube connecting the two chambers and extending above the liquid level in the upper chamber and below the liquid level in the lower chamber, an indicating tube having one end extending into the liquid of the upper chamber and the other end adapted to be connected to the space above the level of the boiling material, a branch tube connecting the air space of the upper chamber with the atmosphere, and a tube connected to the air space of the lower chamber and adapted to be connected to an air bell below the level of the boiling material.

A. MALICOV.